US012803137B2

(12) United States Patent
Mizuno et al.

(10) Patent No.: US 12,803,137 B2
(45) Date of Patent: Nov. 17, 2026

(54) WIRING MEMBER HAVING A BASE MEMBER THAT INCLUDES A BENDING ROUTE PART

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Housei Mizuno, Osaka (JP); Kyousyou Kou, Osaka (JP); Miyu Aramaki, Osaka (JP); Junichi Shirakawa, Mie (JP); Ryo Aragaki, Mie (JP); Toshio Shimizu, Mie (JP); Yusaku Sato, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 182 days.

(21) Appl. No.: 18/727,763

(22) PCT Filed: Jan. 6, 2023

(86) PCT No.: PCT/JP2023/000203
§ 371 (c)(1),
(2) Date: Jul. 10, 2024

(87) PCT Pub. No.: WO2023/136219
PCT Pub. Date: Jul. 20, 2023

(65) Prior Publication Data
US 2025/0183505 A1 Jun. 5, 2025

(30) Foreign Application Priority Data
Jan. 14, 2022 (JP) ................................ 2022-004356

(51) Int. Cl.
*H01P 1/02* (2006.01)
*H01P 3/10* (2006.01)

(52) U.S. Cl.
CPC . *H01P 1/02* (2013.01); *H01P 3/10* (2013.01)

(58) Field of Classification Search
CPC ................ H01P 1/02; H01P 3/10; H02G 3/04
See application file for complete search history.

(56) References Cited

U.S. PATENT DOCUMENTS

2017/0069945 A1* 3/2017 Baba ...................... H01P 3/085
2021/0210250 A1 7/2021 Nishimura et al.
(Continued)

FOREIGN PATENT DOCUMENTS

CN 101385190 A * 3/2009 ............ H01P 32/023
CN 105101616 A * 11/2015 ............ H05K 1/025
(Continued)

OTHER PUBLICATIONS

International Search Report issued in International Patent Application No. PCT/JP2023/000203, dated Feb. 28, 2023.
(Continued)

*Primary Examiner* — Andrea Lindgren Baltzell
*Assistant Examiner* — Kimberly E Glenn
(74) *Attorney, Agent, or Firm* — GREENBLUM & BERNSTEIN, P.L.C.

(57) ABSTRACT

A wiring member includes a first wire-like transmission member, a second wire-like transmission member bended and deformed more easily than the first wire-like transmission member, and a base member to which the first wire-like transmission member and the second wire-like transmission member are fixed. The base member includes a bending route part. The first wire-like transmission member is disposed to be bended along the bending route part. The first wire-like transmission member extends to pass through a
(Continued)

first lateral part along a width direction of the base member on an entrance side along a width direction of the bending route part. The first wire-like transmission member extends to pass through a second lateral part along the width direction of the base member on an exit side along the extension direction of the bending route part.

5 Claims, 3 Drawing Sheets

(56) References Cited

U.S. PATENT DOCUMENTS

| | | | | |
|---|---|---|---|---|
| 2022/0024393 | A1 | 1/2022 | Nishimura et al. | |
| 2022/0029400 | A1 | 1/2022 | Ishida et al. | |
| 2022/0385050 | A1 | 12/2022 | Arai et al. | |
| 2023/0137177 | A1 | 5/2023 | Mizushita et al. | |
| 2023/0147609 | A1 | 5/2023 | Tanaka et al. | |
| 2023/0162885 | A1* | 5/2023 | Kou | H02G 3/0456 174/72 A |
| 2023/0187103 | A1* | 6/2023 | Aramaki | H01B 7/40 174/72 A |
| 2024/0282478 | A1* | 8/2024 | Aramaki | H01B 7/00 |
| 2025/0006404 | A1* | 1/2025 | Mizuno | H01B 7/0846 |

FOREIGN PATENT DOCUMENTS

| | | | |
|---|---|---|---|
| JP | 58-168010 | 11/1983 | |
| JP | 4-248209 | 9/1992 | |
| JP | 2019-207816 | 12/2019 | |
| JP | 2021-82510 | 5/2021 | |
| JP | 2021-150058 | 9/2021 | |
| JP | 7371557 B2 * | 10/2023 | H01B 13/01254 |
| WO | 2020/122163 | 6/2020 | |
| WO | 2021/187102 | 9/2021 | |

OTHER PUBLICATIONS

International Preliminary Report on Patentability issued in International Patent Application No. PCT/JP2023/000203, dated Feb. 16, 2024.

Japanese Notice of Reasons for Refusal issued in Japanese Patent Application No. 2022-004356, dated Jan. 28, 2025, and English language translation thereof.

* cited by examiner

WIRING MEMBER HAVING A BASE MEMBER THAT INCLUDES A BENDING ROUTE PART

TECHNICAL FIELD

The present disclosure relates to a wiring member.

BACKGROUND ART

Patent Document 1 discloses a wiring member in which a first wire-like transmission member and a second wire-like transmission member bended and deformed more easily than the first wire-like transmission member are fixed to a base member.

PRIOR ART DOCUMENTS

Patent Document(s)

Patent Document 1: Japanese Patent Application Laid-Open No. 2021-082510

SUMMARY

Problem to be Solved by the Invention

It is desired that a wire-like transmission member is disposed more appropriately on a bending route part of a base member.

Accordingly, an object is to provide a technique capable of locating a wire-like transmission member more appropriately on a bending route part of a base member.

Means to Solve the Problem

A wiring member according to the present disclosure is a wiring member including: a first wire-like transmission member; at least one second wire-like transmission member bended and deformed more easily than the first wire-like transmission member; and a base member to which the first wire-like transmission member and the second wire-like transmission member are fixed, wherein the base member includes a bending route part, the first wire-like transmission member is disposed to be bended along the bending route part, the first wire-like transmission member extends to pass through a first lateral part along a width direction of the base member on an entrance side along an extension direction of the bending route part, and the first wire-like transmission member extends to pass through a second lateral part along the width direction of the base member on an exit side along the extension direction of the bending route part.

Effects of the Invention

According to the present disclosure, the wire-like transmission member can be disposed more appropriately on the bending route part of the base member.

DESCRIPTION OF EMBODIMENT(S)

Description of Embodiments of Present Disclosure

Figure 1:
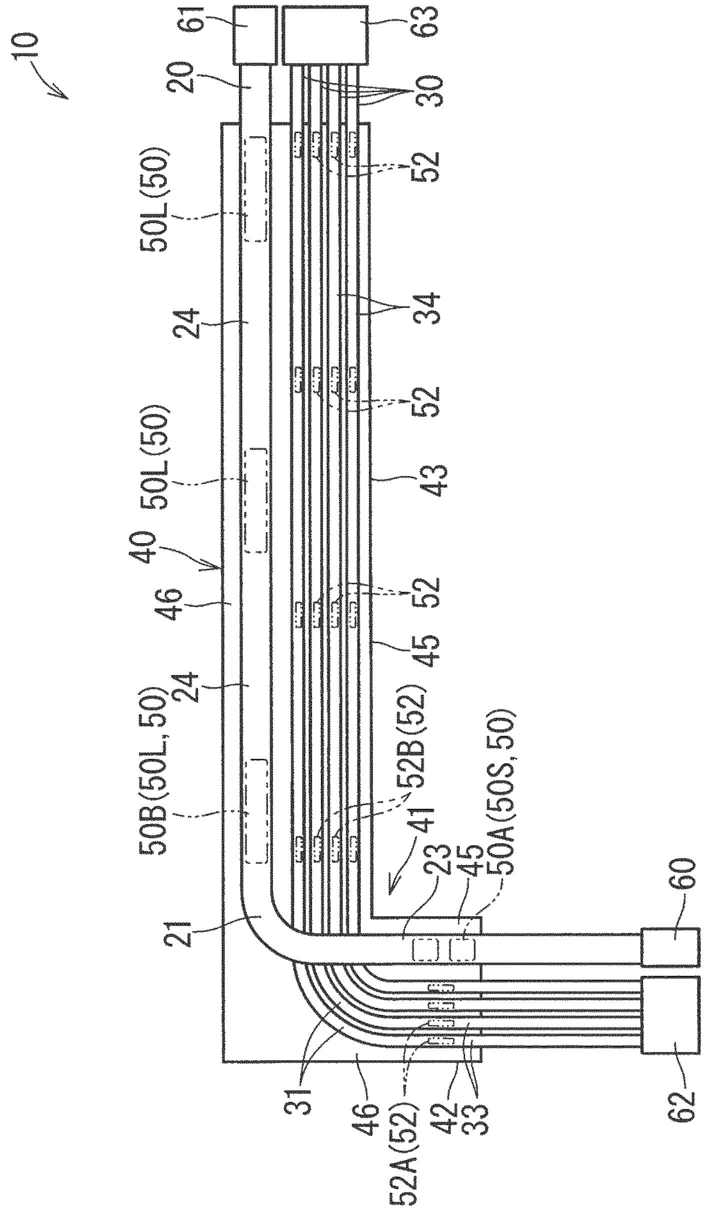
FIG. 1 is a plan view illustrating a wiring member according to an embodiment 1.

Embodiments of the present disclosure are listed and described firstly.

A wiring member according to the present disclosure is as follows.

(1) A wiring member includes: a first wire-like transmission member; at least one second wire-like transmission member bended and deformed more easily than the first wire-like transmission member; and a base member to which the first wire-like transmission member and the second wire-like transmission member are fixed, wherein the base member includes a bending route part, the first wire-like transmission member is disposed to be bended along the bending route part, the first wire-like transmission member extends to pass through a first lateral part along a width direction of the base member on an entrance side along an extension direction of the bending route part, and the first wire-like transmission member extends to pass through a second lateral part along the width direction of the base member on an exit side along the extension direction of the bending route part. The first wire-like transmission member is shifted from the first lateral part to the second lateral part along the width direction of the base member when the first wire-like transmission member passes through the bending route part. Accordingly, the first wire-like transmission member can be easily bended at an appropriate angle. Accordingly, the wire-like transmission member can be disposed more appropriately on the bending route part of the base member.

(2) In the wiring member according to (1), the first wire-like transmission member and the second wire-like transmission member may intersect with each other at the bending route part. Even in this case, when the first wire-like transmission member passes through the bending route part, the first wire-like transmission member is shifted from the first lateral part to the second lateral part along the width direction of the base member. Thus, when the second wire-like transmission member intersects with the first wire-like transmission member, they intersect at one intersection point, and an intersection state is stabilized.

(3) In the wiring member according to (2), it is applicable that the second wire-like transmission member is disposed to be bended along the bending route part, the second wire-like transmission member extends to pass closer to the second lateral part of the base member than the first wire-like transmission member on the entrance side along the extension direction of the bending route part, and the second wire-like transmission member extends to pass closer to the first lateral part of the base member than the first wire-like transmission member on the exit side along the extension direction of the bending route part. Accordingly, even in a case where the second wire-like transmission member is disposed to be bended along the bending route part together with the first wire-like transmission member, tightness of a route of the second wire-like transmission member is suppressed.

(4) In the wiring member according (3), it is applicable that the plurality of second wire-like transmission members are disposed to be bended along the bending route part, and a curvature radius of the second wire-like transmission member disposed on an outermost peripheral side in the plurality of second wire-like transmission members is larger than a curvature radius of the first wire-like transmission member. Accordingly, the plurality of second wire-like transmission members are easily disposed to be bended along the bending route part.

(5) In the wiring member according to any one of (2) to (4), the second wire-like transmission member may be located closer to a side of the base member than the first wire-like transmission member in an intersection part where the first wire-like transmission member and the second wire-like transmission member intersect with each other. Accordingly, the first wire-like transmission member suppresses the second wire-like transmission member being away from base member.

(6) In the wiring member according to any one of (1) to (5), it is applicable that the first wire-like transmission member is fixed to the base member via an entrance-side first fixing part and the second wire-like transmission member is fixed to the base member via an entrance-side second fixing part on the entrance side along the extension direction of the bending route part, the first wire-like transmission member is fixed to the base member via an exit-side first fixing part and the second wire-like transmission member is fixed to the base member via an exit-side second fixing part on the exit side along the extension direction of the bending route part, and at least one of the entrance-side first fixing part and/or the exit-side first fixing part is an elongated fixing part having a length dimension of fixing the first wire-like transmission member to the base member larger than any of a length dimension of the entrance-side second fixing part fixing the second wire-like transmission member to the base member and a length dimension of the exit-side second fixing part fixing the second wire-like transmission member to the base member. The first wire-like transmission member is kept in a bended state more hardly than the second wire-like transmission member. Even in this case, at least one of the entrance-side first fixing part and/or the exit-side first fixing part is the elongated fixing part, thus the first wire-like transmission member is easily kept in a bended state.

(7) In the wiring member according to any one of (1) to (6), it is applicable that the bending route part is a first bending route part, the base member includes a second bending route part located on the exit side along an extension direction of the first bending route part, the first wire-like transmission member is disposed to be bended along the second bending route part, an entrance side along an extension direction of the second bending route part is a part connected to an exit side along the extension direction of the first bending route part, the first wire-like transmission member extends to pass through the second lateral part along the width direction of the base member in a manner similar to an exit side along the extension direction of the first bending route part on an entrance side along the extension direction of the second bending route part, and the first wire-like transmission member extends to pass through the first lateral part along the width direction of the base member on an exit side along the extension direction of the second bending route part. The first wire-like transmission member is shifted from the first lateral part to the second lateral part along the width direction of the base member when the first wire-like transmission member passes through the first bending route part, and is shifted from the second lateral part to the first lateral part along the width direction of the base member when the first wire-like transmission member passes through the second bending route part. Accordingly, the first wire-like transmission member can be easily bended at an appropriate angle in each of the first bending route part and the second bending route part.

Detailed Description of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

A wiring member according to an embodiment 1 is described hereinafter. FIG. 1 is a plan view illustrating a wiring member 10 according to the embodiment 1.

The wiring member 10 includes a first wire-like transmission member 20, a second wire-like transmission member 30, and a base member 40.

The first wire-like transmission member 20 and the second wire-like transmission member 30 are assumed to be wire-like transmission members connecting components in a vehicle. The first wire-like transmission member 20 and the second wire-like transmission member 30 extend along wiring routes corresponding to positions of components as connection destinations of the wire-like transmission members 20 and 30.

More specifically, it is sufficient that the wire-like transmission member is a wire-like member transmitting electricity or light, for example. For example, the wire-like transmission member may be a general wire having a core wire and a covering around the core wire, or may also be a bare wire, a shielded wire, a twisted wire, an enamel wire, a nichrome wire, or an optical fiber.

The wire-like transmission member transmitting the electricity may be various kinds of signal lines or various kinds of power lines. Some of the wire-like transmission members transmitting the electricity may be used as an antenna or coil, for example, transmitting or receiving a signal or electrical power to or from a space.

The wire-like transmission member may be a single wire-like object or a composite object of a plurality of wire-like objects (a twisted wire and a cable made up of a plurality of wire-like objects covered by a sheath).

Description herein is mainly based on an assumption that the first wire-like transmission member 20 is a first electrical wire 20 and the second wire-like transmission member 30 is a second electrical wire 30. In the present embodiment, the wiring member 10 includes one first electrical wire 20 and four second electrical wires 30. The plurality of first electrical wires 20 may also be provided. The number of the second electrical wires 30 may be one, or two, three, or five or more second electrical wires 30 are also applicable. The number of the first electrical wires 20 is smaller than that of the second electrical wires 30. The number of the first electrical wires 20 may be equal to or larger than that of the second electrical wires 30.

The second wire-like transmission member 30 is bended and deformed more easily than the first wire-like transmission member 20. For example, easiness of bending deformation depends on bending rigidity. For example, bending rigidity of the second wire-like transmission member 30 is lower than that of the first wire-like transmission member 20. It may be determined, which one is bended and deformed more easily, the first wire-like transmission member 20 or the second wire-like transmission member 30, by measuring force from a predetermined initial state (for example, a straight state) to a predetermined deformation state in a bending test such as a three-point or four-point bending test under normal temperature environment, for example.

Generally, the thin wire-like body is bended and deformed more easily than the thick wire-like body, thus the second wire-like transmission member 30 can be considered to be thinner than the first wire-like transmission member 20. Described in the present embodiment is an example that the second electrical wire 30 is thinner than the first electrical wire 20.

When physical properties of a material itself constituting the first wire-like transmission member 20 and physical properties of a material itself constituting the second wire-like transmission member 30 are significantly different from each other, for example, a thick wire-like body may be bended and deformed more easily than a thin wire-like body in some cases. Assumed is a case where the first wire-like transmission member 20 and the second wire-like transmission member 30 are electrical wires, for example. Polyvinyl chloride (PVC) or polyethylene (PE), for example, is used as a covering of the electrical wire. Generally, PVC is more flexible than PE. Thus, the PVC covering electrical wire tends to be bended and deformed easily, and the PE covering electrical wire tends to be hardly bended and deformed. In such a case, even when the first wire-like transmission member 20 is thinner than the second wire-like transmission member 30, there may be a case where the second wire-like transmission member 30 is bended and deformed more easily than the first wire-like transmission member 20.

It is also applicable that the first wire-like transmission member 20 is a shield wire including a conductive layer, a first covering layer, a shield layer, and a second covering layer, and the second wire-like transmission member 30 is a general wire including a conductive layer and only one covering layer, thus the second wire-like transmission member 30 is bended and deformed more easily than the first wire-like transmission member 20.

The base member 40 is a member to which the first electrical wire 20 and the second electrical wire 30 are fixed. The base member 40 includes a main surface. The first electrical wire 20 and the second electrical wire 30 are fixed on the main surface, thus the first electrical wire 20 and the second electrical wire 30 are held along predetermined routes. That is to say, the base member 40 is also considered a member including the main surface holding the first electrical wire 20 and the second electrical wire 30 along the predetermined routes.

The base member 40 includes a bending route part 41. Herein, the base member 40 includes a first band-like part 42 and a second band-like part 43. The first band-like part 42 is formed into an elongated quadrangular shape. The second band-like part 43 is also formed into an elongated quadrangular shape. The first band-like part 42 and the second band-like part 43 extend in directions intersecting with each other. A portion where the first band-like part 42 and the second band-like part 43 intersect with each other is a bending route part 41.

Herein, the base end portion of the first band-like part 42 and a base end portion of the second band-like part 43 are continuously formed. The first band-like part 42 and the second band-like part 43 extend in directions perpendicular to each other. Accordingly, the base member 40 has a shape made up of the first band-like part 42 and the second band-like part 43 continuously formed into an L-like shape. The bending route part 41 is a route bended at an angle of 90 degrees.

However, also applicable is a route bended so that the first band-like part 42 and the second band-like part 43 intersect with each other at an angle other than 90 degrees and the bending route part 41 is bended at an angle other than 90 degrees in the base member 40. The bending route part 41 may be a route bended into a curved shape. For example, a curved band-like part may be provided between the straight first band-like part 42 and the straight second band-like part 43. The base member may have a branched part. At least two band-like parts extend in directions intersecting with each other from the branched part. Thus, the branched part includes the bending route part. An example that the base member includes the branched part is described hereinafter.

The first electrical wire 20 is disposed to be bended along the bending route part 41. The first electrical wire 20 includes a curved section 21, a first straight section 23, and a second straight section 24. The curved section 21 is a section disposed to be bended along the bending route part 41. The first straight section 23 is a section extending straight along the first band-like part 42. The second straight section 24 is a section extending straight along the second band-like part 43. The curved section 21 is a section located between the first straight section 23 and the second straight section 24.

Herein, the second electrical wire 30 is disposed to be bended along the bending route part 41 together with the first electrical wire 20. The second electrical wire 30 includes a curved section 31, a first straight section 33, and a second straight section 34. The curved section 31 is a section disposed to be bended along the bending route part 41. The first straight section 33 is a section extending straight along the first band-like part 42. The second straight section 34 is a section extending straight along the second band-like part 43. The curved section 31 is a section located between the first straight section 33 and the second straight section 34.

However, the route of the second electrical wire 30 on the base member 40 is not particularly limited, but can be appropriately set. For example, the second electrical wire 30 may be disposed without following the bending route part 41. In this case, the second electrical wire 30 may follow the first electrical wire 20 on any one of one side and the other side of the bending route part 41. The second electrical wires 30 may be disposed without following the first electrical wire 20 at all. It is sufficient that the second electrical wire 30 follows the first electrical wire 20 along at least one of one side and/or the other side of the bending route part 41.

One end portion of the first electrical wire 20 extends from a tip end portion of the first band-like part 42 to be connected to a connector 60. The other end portion of the first electrical wire 20 extends from a tip end portion of the second band-like part 43 to be connected to a connector 61. One end portion of the second electrical wire 30 extends from the tip end portion of the first band-like part 42 to be connected to a connector 62 different from the connector 60. The other end portion of the second electrical wire 30 extends from the tip end portion of the second band-like part 43 to be connected to a connector 63 different from the connector 61. One end portion of the first electrical wire 20 and one end portion of the second electrical wire 30 may be connected to the same connector. The other end portion of the first electrical wire 20 and the other end portion of the second electrical wire 30 may be connected to the same connector. It is also applicable that the end portion of each electrical wire does not extend from the base member 40 but is connected to the connector. In this case, the connector may be fixed to the base member 40.

The first electrical wire 20 extends to pass through a first lateral part 45 along a width direction of the base member 40 on an entrance side along an extension direction of the bending route part 41. The first electrical wire 20 extends to pass through a second lateral part 46 along a width direction of the base member 40 on an exit side along the extension direction of the bending route part 41. The terms of entrance and exit are terms for distinguishing one side and the other side along the extension direction of the bending route part 41. Herein, a side of the first electrical wire 20 closer to a side of the connector 60 in relation to an intermediate part thereof is referred to as the entrance side, and a side thereof closer to a side of the connector 61 is referred to as the exit side. Needless to say, the side of the connector 61 may be the entrance side, and the side of the connector 60 may be the exit side. The terms of the first lateral part 45 and the second lateral part 46 are terms for distinguishing one side and the other side along the width direction of the base member 40. Herein, in a case where a thickness direction of the base member 40 is an up-down direction, and a direction to which a main surface, to which the first electrical wire 20 and the second electrical wire 30 are fixed, of the base member 40 is directed is an upper side, a right lateral part is the first lateral part 45, and a left lateral part is the second lateral part 46 when a cross section along a direction perpendicular to an extension direction of the first electrical wire 20 is seen from the side of the connector 60.

The first electrical wire 20 passes through the first lateral part 45 in the first straight section 23, and passes through the second lateral part 46 in the second straight section 24. The first electrical wire 20 is shifted from the first lateral part 45 toward the second lateral part 46 in the curved section 21.

The second electrical wire 30 extends to pass closer to the second lateral part 46 than the first electrical wire 20 on the entrance side along the extension direction of the bending route part 41. The second electrical wire 30 extends to pass closer to the first lateral part 45 than the first electrical wire 20 on the exit side along the extension direction of the bending route part 41. The second electrical wire 30 passes through the second lateral part 46 in the first straight section 33, and passes through the first lateral part 45 in the second straight section 34. The second electrical wire 30 is shifted from the second lateral part 46 toward the first lateral part 45 in the curved section 31.

The first electrical wire 20 and the second electrical wire 30 intersect with each other in the bending route part 41. In the intersection part where the first electrical wire 20 and the second electrical wire 30 intersect with each other, the second electrical wire 30 is located closer to the base member 40 than the first electrical wire 20.

In the curved section 21, the first electrical wire 20 may be disposed to be curved at a curvature radius equal to or larger than a minimum curvature radius set to the first electrical wire 20, for example. In the curved section 31, the second electrical wire 30 may be disposed to be curved at a curvature radius equal to or larger than a minimum curvature radius set to the second electrical wire 30, for example. The minimum curvature radius set to the electrical wire herein is a value set to prevent excessive bending of the electrical wire, and generally tends to have a positive correlation with hardness of bending of the electrical wire. That is to say, an electrical wire bended more hardly tends to have a larger minimum curvature radius, and an electrical wire bended more easily tends to have a smaller minimum curvature radius. Herein, the second electrical wire 30 is bended more easily than the first electrical wire 20, thus the minimum curvature radius set to the second electrical wire 30 is smaller than that set to the first electrical wire 20.

Four second electrical wires 30 are bended at curvature radii different from each other in the curved section. A center of curvature of each of four second electrical wires 30 may be the same as each other, for example. In this case, the curvature radius of the second electrical wire 30 gets larger with increasing distance from the center of curvature. The curvature radius of the second electrical wire 30 disposed on an outermost peripheral side in four second electrical wires 30 is larger than that of the first electrical wire 20. However, the curvature radius of the second electrical wire 30 disposed on the outermost peripheral side in four second electrical wires 30 may be equal to or smaller than that of the first electrical wire 20.

A fixing part where the first electrical wire 20 and the base member 40 are fixed is a first fixing part 50. Herein, the plurality of first fixing parts 50 are provided at intervals along the extension direction of the first electrical wire 20. The first electrical wire 20 is fixed to the base member 40 via the plurality of first fixing parts 50, and is held along a predetermined route on the base member 40. The plurality of first fixing parts 50 fix at least a part of the first electrical wire 20 extending straight to the base member 40. Herein, the state where the first electrical wire 20 extends straight indicates that the first electrical wire 20 extends along one direction when the main surface of the base member 40 is observed in a plan view. The first fixing part 50 fixes the first electrical wire 20 to the base member 40 in a bended state. A part of the first electrical wire 20 other than the part fixed by the first fixing part 50 may be bended and fixed to the base member 40.

The first electrical wire 20 is fixed to the base member 40 via an entrance-side first fixing part 50A in the entrance side along the extension direction of the bending route part 41. The first electrical wire 20 is fixed to the base member 40 via an exit-side first fixing part 50B in the exit side along the extension direction of the bending route part 41. The first electrical wire 20 is not fixed to the base member 40 between the entrance-side first fixing part 50A and the exit-side first fixing part 50B. The first electrical wire 20 intersects with the second electrical wire 30 between the entrance-side first fixing part 50A and the exit-side first fixing part 50B.

A fixing part where the second electrical wire 30 and the base member 40 are fixed is a second fixing part 52. Herein, the plurality of second fixing parts 52 are provided at intervals along an extension direction of the second electrical wire 30. The second electrical wire 30 is fixed to the base member 40 via the plurality of second fixing parts 52, and is held along a predetermined route on the base member 40. The plurality of second fixing parts 52 fix at least a part of the second electrical wire 30 extending straight to the base member 40. Herein, the state where the second electrical wire 30 extends straight may be considered to be the same as the case where the first electrical wire 20 extends straight. The second fixing part 52 fixes the second electrical wire 30 to the base member 40 in a bended state. A part of the second electrical wire 30 other than the part fixed by the second fixing part 52 is bended and fixed to the base member 40.

The second electrical wire 30 is fixed to the base member 40 via an entrance-side second fixing part 52A in the entrance side along the extension direction of the bending route part 41. The second electrical wire 30 is fixed to the base member 40 via an exit-side second fixing part 52B in the exit side along the extension direction of the bending route part 41. The second electrical wire 30 is not fixed to the base member 40 between the entrance-side second fixing part 52A and the exit-side second fixing part 52B. The second electrical wire 30 intersects with the first electrical wire 20 between the entrance-side second fixing part 52A and the exit-side second fixing part 52B.

At least one of the entrance-side first fixing part 50A and/or the exit-side first fixing part 50B is an elongated fixing part 50L. The elongated fixing part 50L is an elongated fixing part having a length dimension of fixing the first electrical wire 20 to the base member 40 larger than any of a length dimension of the entrance-side second fixing part 52A fixing the second electrical wire 30 to the base member 40 and a length dimension of the exit-side second fixing part 52B fixing the second electrical wire 30 to the base member 40. Herein, the exit-side first fixing part 50B is the elongated fixing part 50L. Herein, the entrance-side first fixing part 50A is not the elongated fixing part 50L. The entrance-side first fixing part 50A is a short fixing part 50S. The short fixing part 50S is a fixing part having a length dimension of fixing the first electrical wire 20 to the base member 40 is smaller than a length dimension of the elongated fixing part 50L fixing the first electrical wire 20 to the base member 40. The short fixing part 50S has the same length dimension as the length dimension of the entrance-side second fixing part 52A fixing the second electrical wire 30 to the base member 40 and the length dimension of the exit-side second fixing part 52B fixing the second electrical wire 30 to the base member 40, for example.

Any fixing state is applicable as a fixing state of the first electrical wire 20 and the second electrical wire 30 to the base member 40 as long as the first electrical wire 20 or the second electrical wire 30 is fixed to the base member 40 at a partial position in the extension direction, and contact area fixation and non-contact area fixation are applicable. Herein, the contact area fixation indicates that a portion where the first electrical wire 20 or the second electrical wire 30 has contact with the base member 40 is stuck and fixed. The non-contact area fixation indicates the fixing state which is not the contact area fixation. The non-contact area fixation indicates that a member for fixation such as a sewing thread or an adhesive tape, for example, presses the first electrical wire 20 or the second electrical wire 30 toward the base member 40 to keep the pressing state. In the description hereinafter, the first electrical wire 20 or the second electrical wire 30 and the base member 40 are in the state of the contact area fixation.

Applicable as the configuration of the contact area fixation are a contact area indirect fixation and a contact area direct fixation, or both fixations may also be used together in different regions. Herein, the contact area indirect fixation indicates that the base member 40 and the first electrical wire 20 or the second electrical wire 30 are indirectly stuck and fixed via an indirect fixation part such as an adhesive agent, a gluing agent, and a double-sided adhesive tape provided therebetween. The contact area direct fixation indicates that the base member 40 and the first electrical wire 20 or the second electrical wire 30 are directly stuck and fixed without an intervention of the adhesive agent, for example, which is separately provided. Considered in the contact area direct fixation is that resin included in at least one of the base member 40 and/or the first electrical wire 20 or the second electrical wire 30 is melted, thus the base member 40 and the first electrical wire 20 or the second electrical wire 30 are stuck and fixed, for example.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as welding, fusion, and melting joint can be used. For example, when the contact area direct fixation by heat is formed by fusion, adoptable are various types of fusion means such as ultrasonic fusion, heating pressurizing fusion, hot air fusion, and high-frequency fusion. When the state of the contact area direct fixation is formed by these means, the first electrical wire 20 or the second electrical wire 30 and the base member 40 are in the state of the contact area direct fixation by these means. Specifically, when the state of the contact area direct fixation is formed by the ultrasonic fusion, for example, the first electrical wire 20 or the second electrical wire 30 and the base member 40 are in the state of the contact area direct fixation by the ultrasonic fusion. The description herein is based on an assumption that the first fixing part 50 is a part fusing and fixing the first electrical wire 20 to the base member 40, and the second fixing part 52 is a part fusing and fixing the second electrical wire 30 to the base member 40. Particularly, the description is based on an assumption that these fusion fixing parts are fixing parts by ultrasonic fusion. That is to say, the first fixing part 50 is a spot fusion part in which resin constituting the base member 40 and resin constituting the covering of the first electrical wire 20 are fixed by ultrasonic fusion. The second fixing part 52 is a spot fusion part in which resin constituting the base member 40 and resin constituting the covering of the second electrical wire 30 are fixed by ultrasonic fusion.

It is sufficient that the base member 40 is a member having the main surface for fixing the first electrical wire 20 and the second electrical wire 30 as described above, thus may be formed into a sheet-like shape or a three-dimensional shape. The main surface may be a planar surface, a curved surface, a convex-concave surface, or a surface in which a planar surface and the other curved surface, for example are combined. For example, the base member 40 is a member having a flat part, more specifically, a bendable sheet member. The base member 40 preferably has flexibility of being easily bended in a thickness direction.

A material constituting the base member 40 is not particularly limited, however, the base member 40 is preferably formed of a material containing resin of PVC, PE, polyethylene terephthalate (PET), or polypropylene (PP). The base member 40 may be a sheet material with an inner portion evenly filled or a non-woven sheet, for example. The base member 40 may contain a material such as metal. The sheet member may be made up of a single layer or a plurality of stacked layers. When the sheet member is made up of the plurality of stacked layers, it is considered that a resin layer and a resin layer are stacked, for example. More specifically, for example, the sheet member is considered to be made up of a resin sheet material with an inner portion evenly filled and a non-woven sheet stacked on each other. It is also considered that the sheet member is made up of a resin layer and a metal layer stacked on each other, for example.

Effect Etc

According to the wiring member 10 having the above configuration, when the first electrical wire 20 passes through the bending route part 41, the first electrical wire 20 is shifted from the first lateral part 45 to the second lateral part 46 along the width direction of the base member 40. Accordingly, the first electrical wire 20 can be bended at an appropriate angle. Accordingly, the electrical wire can be disposed more appropriately on the bending route part 41 of the base member 40.

For example, when the first electrical wire 20 is disposed along an inner peripheral side along the width direction of the base member 40 while passing through the bending route part 41, there is a case where the curvature radius gets too small. For example, when the first electrical wire 20 is disposed along an outer peripheral side along the width direction of the base member 40 while passing through the bending route part 41, there is a possibility that an area where the second electrical wire 30 is disposed gets narrow or the first electrical wire 20 intersects with one second electrical wire 30 twice in one bending route part 41. When the first electrical wire 20 passes through the bending route part 41, the first electrical wire 20 is shifted from the first lateral part 45 to the second lateral part 46 along the width direction of the base member 40, thus these situations can be suppressed. The first electrical wire 20 bended more hardly than the second electrical wire 30 is located in the first lateral part 45 or the second lateral part 46 along the width direction of the base member 40, thus the wiring member 10 can be easily routed when the wiring member 10 is assembled to a vehicle, for example.

The first electrical wire 20 and the second electrical wire 30 intersect with each other in the bending route part 41. Even in this case, when the first electrical wire 20 passes through the bending route part 41, the first electrical wire 20 is shifted from the first lateral part 45 to the second lateral part 46 along the width direction of the base member 40. Thus, when the second electrical wire 30 intersects with the first electrical wire 20, they intersect at one intersection point, and an intersection state is stabilized.

The second electrical wire 30 is disposed to be curved along the bending route part 41, the second electrical wire 30 extends to pass closer to the second lateral part 46 of the base member 40 than the first electrical wire 20 in the entrance side along the extension direction of the bending route part 41, and the second electrical wire 30 extends to pass closer to the first lateral part 45 of the base member 40 than the first electrical wire 20 in the exit side along the extension direction of the bending route part 41. Accordingly, even in a case where the second electrical wire 30 is disposed to be bended along the bending route part 41 together with the first electrical wire 20, tightness of a route of the second electrical wire 30 is suppressed.

The plurality of second electrical wires 30 are disposed to be curved along the bending route part 41, and the curvature radius of the second electrical wire 30 disposed on the outermost peripheral side of the plurality of second electrical wires 30 is larger than that of the first electrical wire 20. Accordingly, the plurality of second electrical wires 30 are easily disposed to be bended along the bending route part 41.

In the intersection part where the first electrical wire 20 and the second electrical wire 30 intersect with each other, the second electrical wire 30 is located closer to the base member 40 than the first electrical wire 20. Accordingly, the first electrical wire 20 suppresses the second electrical wire 30 being away from base member 40.

The first electrical wire 20 is fixed to the base member 40 via the entrance-side first fixing part 50A and the second electrical wire 30 is fixed to the base member 40 via the entrance-side second fixing part 52A in the entrance side along the extension direction of the bending route part 41, the first electrical wire 20 is fixed to the base member 40 via the exit-side first fixing part 50B and the second electrical wire 30 is fixed to the base member 40 via the exit-side second fixing part 52B in the exit side along the extension direction of the bending route part 41, and at least one of the entrance-side first fixing part 50A and/or the exit-side first fixing part 50B is the elongated fixing part 50L having the length dimension of fixing the first electrical wire 20 to the base member 40 larger than any of the length dimension of the entrance-side second fixing part 52A fixing the second electrical wire 30 to the base member 40 and the length dimension of the exit-side second fixing part 52B fixing the second electrical wire 30 to the base member 40. The first electrical wire 20 is hardly kept in a bended state than the second electrical wire 30. Even in this case, at least one of the entrance-side first fixing part 50A and/or the exit-side first fixing part 50B is the elongated fixing part 50L, thus the first electrical wire 20 is easily kept in a bended state.

Embodiment 2

Figure 2:
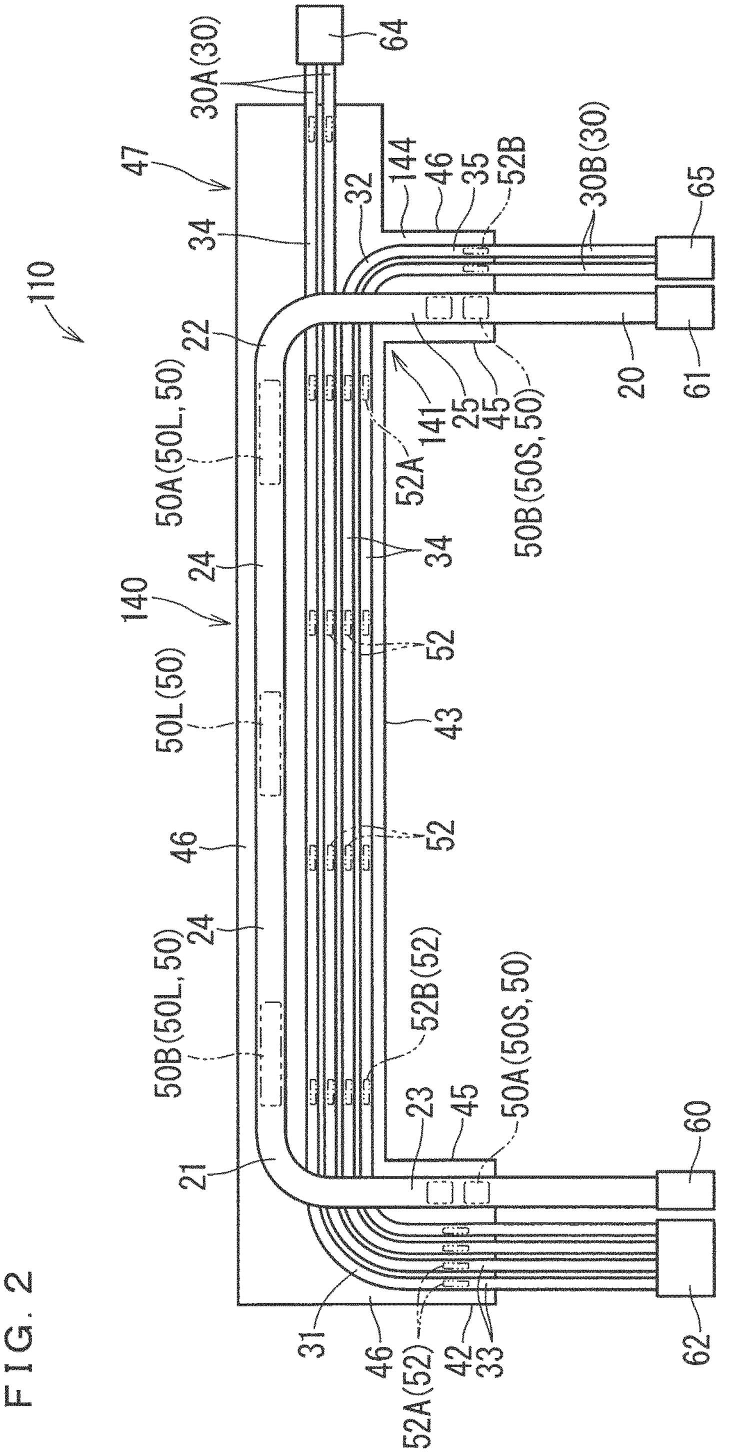
FIG. 2 is a plan view illustrating a wiring member according to an embodiment 2.

A wiring member according to an embodiment 2 is described. FIG. 2 is a plan view illustrating a wiring member 110 according to the embodiment 2. In the following description of the present embodiment, the same reference numerals are assigned to the similar constituent elements described above, and the description thereof will be omitted.

A base member 140 includes a first bending route part 41 and a second bending route part 141. Herein, the first bending route part 41 is the same as the bending route part 41 described above according to the embodiment 1. An arrangement of the first electrical wire 20 and the second electrical wire 30 in the first bending route part 41 is also the same as that according to the embodiment 1. The second bending route part 141 is located on the exit side along the extension direction of the first bending route part 41. An entrance side along an extension direction of the second bending route part 141 is a part connected to the exit side along the extension direction of the first bending route part 41. The first electrical wire 20 is disposed to be bended along the first bending route part 41 and the second bending route part 141.

The first electrical wire 20 extends to pass through the second lateral part 46 in the entrance side along the extension direction of the second bending route part 141 in the manner similar to the exit side along the extension direction of the first bending route part 41. The first electrical wire 20 extends to pass through the first lateral part 45 in the exit side along the extension direction of the second bending route part 141. Accordingly, the first electrical wire 20 is shifted from the first lateral part 45 to the second lateral part 46 when the first electrical wire 20 passes through the first bending route part 41, and is shifted from the second lateral part 46 to the first lateral part 45 when the first electrical wire 20 passes through the second bending route part 141.

More specifically, the base member 40 includes the first band-like part 42, the second band-like part 43, and a third band-like part 144. The third band-like part 144 is continuously formed with the second band-like part 43 at a position different from the first band-like part 42. The third band-like part 144 extend in a direction intersecting with the extension direction of the second band-like part 43. The second bending route part 141 is formed by the second band-like part 43 and the third band-like part 144. The third band-like part 144 is continuously formed with the second band-like part 43 on a side on which the first band-like part 42 is continuously formed.

The first electrical wire 20 includes the first curved section 21, the second curved section 22, the first straight section 23, the second straight section 24, and a third straight section 25. The first curved section 21 is a section disposed to be bended along the first bending route part 41 in the first electrical wire 20, and is a section similar to the curved section 21 described above. The second curved section 22 is a section disposed to be bended along the second bending route part 141 in the first electrical wire 20. The third straight section 25 is a section extending straight along the third band-like part 144. The first straight section 23, the first curved section 21, the second straight section 24, the second curved section 22, and the third straight section 25 are continuously formed in this order from the side of the connector 60 toward the side of the connector 61. The other end portion of the first electrical wire 20 extends from a tip end portion of the third band-like part 144 to be connected to the connector 61.

Herein, the base member 140 includes a branch part 47. The branch part 47 is provided to the second bending route part 141. Herein, a base end portion of the third band-like part 144 is continuously formed with an intermediate part along the extension direction of the second band-like part 43, thus the branch part 47 is generated. It is also applicable that the base end portion of the third band-like part 144 is continuously formed with the tip end portion of the second band-like part 43, thus the base member does not include the branch part 47 but includes the first bending route part 41 and the second bending route part 141.

Four second electrical wires 30 and two second electrical wires 30A are branched from the first electrical wire 20 in the branch part 47. The second electrical wire 30A extends straight to the tip end portion of the second band-like part 43. The second electrical wire 30A is not disposed to be bended along the second bending route part 141. The other end portion of the second electrical wire 30 extends from the tip end portion of the second band-like part 43 to be connected to a connector 64. The second electrical wire 30A includes the curved section 31, the first straight section 33, and the second straight section 34 in the manner similar to the second electrical wire 30 according to the embodiment 1.

Two second electrical wires 30B in four second electrical wires 30 are disposed to be bended along the second bending route part 141. The second electrical wire 30B extends along the first electrical wire 20 also in the second bending route part 141. The second electrical wire 30B is branched from the second electrical wire 30A in the branch part 47. The second electrical wire 30B includes the first curved section 31, the second curved section 32, the first straight section 33, the second straight section 34, and a third straight section 35. The first curved section 31 is a section disposed to be bended along the first bending route part 41 in the second electrical wire 30, and is a section similar to the curved section 31 described above. The second curved section 32 is a section disposed to be bended along the second bending route part 141 in the second electrical wire 30. The third straight section 35 is a section extending straight along the third band-like part 144. The first straight section 33, the first curved section 31, the second straight section 34, the second curved section 32, and the third straight section 35 are continuously formed in this order from the side of the connector 60 toward the side of the connector 61.

The second electrical wire 30B extends to pass closer to the first lateral part 45 than the first electrical wire 20 in the entrance side along the extension direction of the second bending route part 141. The second electrical wire 30B extends to pass closer to the second lateral part 46 than the first electrical wire 20 in the exit side along the extension direction of the second bending route part 141. The other end portion of the second electrical wire 30B extends from the tip end portion of the third band-like part 144 to be connected to the connector 65.

The first electrical wire 20 and the second electrical wire 30 intersect with each other in the second bending route part 141. In the intersection part where the first electrical wire 20 and the second electrical wire 30 intersect with each other, the second electrical wire 30 is located closer to the base member 40 than the first electrical wire 20. The first electrical wire 20 is fixed to the base member 40 by the entrance-side first fixing part 50A and the exit-side first fixing part 50B in the second bending route part 141. The second electrical wire 30 is fixed to the base member 40 by the entrance-side second fixing part 52A and the exit-side second fixing part 52B in the second bending route part 141. The entrance-side first fixing part 50A in the second bending route part 141 is the elongated fixing part 50L.

An effect similar to that of the wiring member 10 according to the embodiment 1 can be obtained also by the wiring member 110 according to the present embodiment. Furthermore, according to the wiring member 110, the first electrical wire 20 is shifted from the first lateral part 45 to the second lateral part 46 when the first electrical wire 20 passes through the first bending route part 41, and is shifted from the second lateral part 46 to the first lateral part 45 when the first electrical wire 20 passes through the second bending route part 141. Accordingly, the first electrical wire 20 can be bended at an appropriate angle in each of the first bending route part 41 and the second bending route part 141.

APPENDIX

Figure 3:
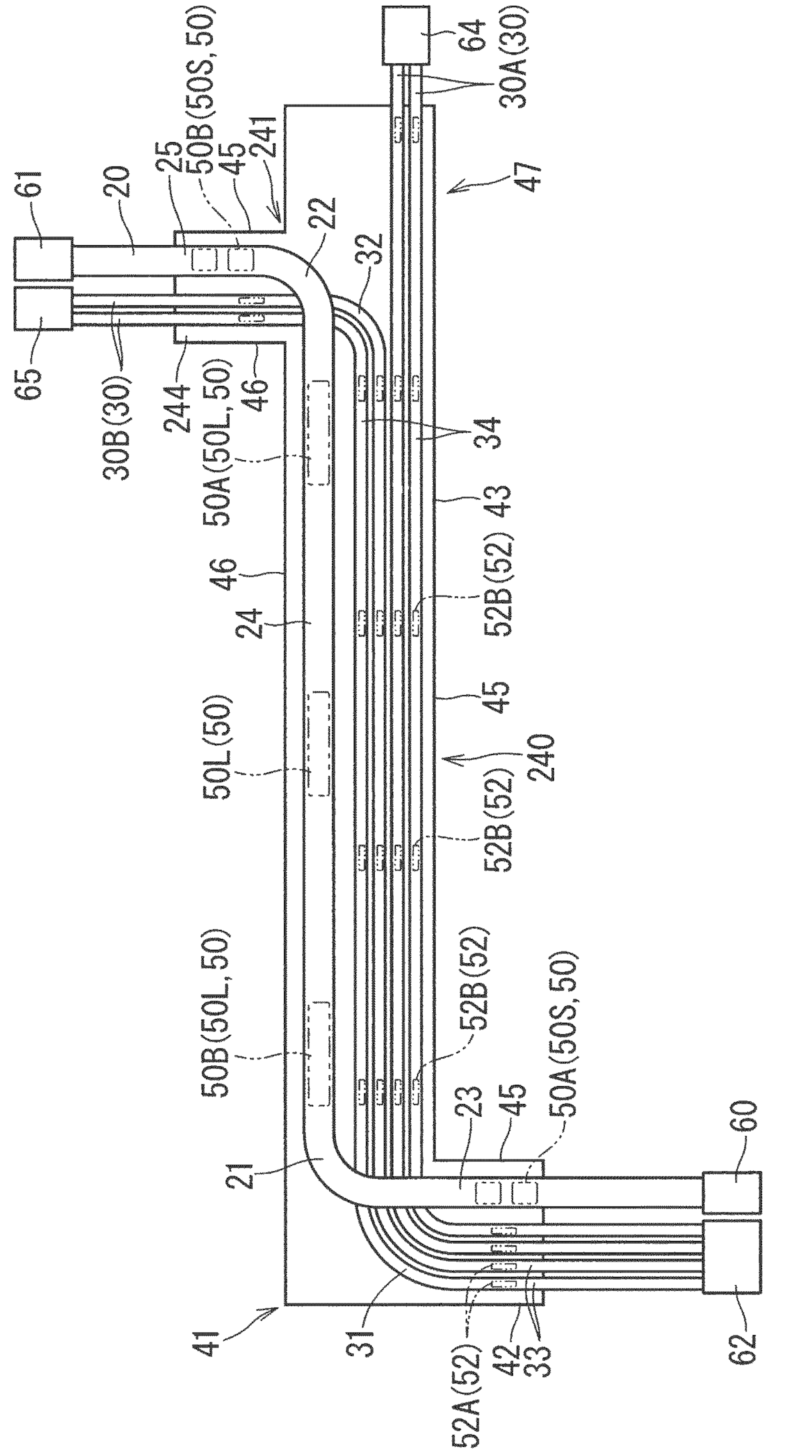
FIG. 3 is a plan view illustrating a modification example of a wiring member according to the embodiment 2.

FIG. 3 is a plan view illustrating a modification example of the wiring member 110 according to the embodiment 2.

In a wiring member 210 according to the modification example, a position where a third band-like part 244 is continuously formed with the second band-like part 43 is different from a position where the third band-like part 144 is continuously formed with the second band-like part 43. The third band-like part 244 is continuously formed with a part of the second band-like part 43 on a side opposite to a side on which the first band-like part 42 is continuously formed. Also in this case, a base member 240 includes a second bending route part 241 in the manner similar to the base member 140 described above.

The configurations described in the embodiments and modification examples thereof can be appropriately combined as long as they are not contradictory.

EXPLANATION OF REFERENCE SIGNS

10 wiring member
20 first electrical wire (first wire-like transmission member)
21 curved section (first curved section)
22 second curved section
23 first straight section
24 second straight section
25 third straight section
30 second electrical wire (second wire-like transmission member)
31 curved section (first curved section)
32 second curved section
33 first straight section
34 second straight section

35 third straight section
40, 140, 240 base member
41 bending route part (first bending route part)
141, 241 second bending route part
42 first band-like part
43 second band-like part
144, 244 third band-like part
45 first lateral part
46 second lateral part
47 branch part
50 first fixing part
50A entrance-side first fixing part
50B exit-side first fixing part
50L elongated fixing part
50S short fixing part
52 second fixing part
52A entrance-side second fixing part
52B exit-side second fixing part
60, 61, 62, 63, 64, 65 connector

The invention claimed is:

1. A wiring member, comprising:

a first wire transmission member;

at least one second wire transmission member bended and deformed more easily than the first wire transmission member; and a base member to which the first wire transmission member and the at least one second wire transmission member are fixed, wherein the base member includes a bending route part, the first wire transmission member and the at least one second wire transmission member intersect with each other in the bending route part while being disposed to be curved along the bending route part so as to extend from a same direction as each other toward an entrance side along an extension direction of the bending route part and extend in a same direction as each other from an exit side along the extension direction of the bending route part, the first wire transmission member extends to pass through a first lateral part along a width direction of the base member and the at least one second wire transmission member extends to pass closer to a second lateral part of the base member than the first wire transmission member on the entrance side along the extension direction of the bending route part, and the first wire transmission member extends to pass through the second lateral part along the width direction of the base member and the at least one second wire transmission member extends to pass closer to the first lateral part of the base member than the first wire transmission member on the exit side along the extension direction of the bending route part.

2. The wiring member according to claim 1, wherein the at least one second wire transmission member comprises a plurality of second wire transmission members disposed to be bended along the bending route part, and a curvature radius of the second wire transmission member disposed on an outermost peripheral side in the plurality of second wire transmission members is larger than a curvature radius of the first wire transmission member.

3. The wiring member according to claim 1, wherein the at least one second wire transmission member is located closer to a side of the base member than the first wire transmission member in an intersection part where the first wire transmission member and the at least one second wire transmission member intersect with each other.

4. The wiring member according to claim 1, wherein the first wire transmission member is fixed to the base member via an entrance-side first fixing part and the at least one second wire transmission member is fixed to the base member via an entrance-side second fixing part on the entrance side along the extension direction of the bending route part, the first wire transmission member is fixed to the base member via an exit-side first fixing part and the at least one second wire transmission member is fixed to the base member via an exit-side second fixing part on the exit side along the extension direction of the bending route part, and at least one of the entrance-side first fixing part and/or the exit-side first fixing part is an elongated fixing part having a length dimension of fixing the first wire transmission member to the base member larger than any of a length dimension of the entrance-side second fixing part fixing the at least one second wire transmission member to the base member and a length dimension of the exit-side second fixing part fixing the at least one second wire transmission member to the base member.

5. The wiring member according to claim 1, wherein the bending route part is a first bending route part, the base member includes a second bending route part located on the exit side along an extension direction of the first bending route part, the first wire transmission member is disposed to be bended along the second bending route part, an entrance side along an extension direction of the second bending route part is a part connected to an exit side along the extension direction of the first bending route part, the first wire transmission member extends to pass through the second lateral part along the width direction of the base member in a manner similar to an exit side along the extension direction of the first bending route part on an entrance side along the extension direction of the second bending route part, and the first wire transmission member extends to pass through the first lateral part along the width direction of the base member on an exit side along the extension direction of the second bending route part.

* * * * *